United States Patent
Nelson et al.

(10) Patent No.: US 9,535,931 B2
(45) Date of Patent: Jan. 3, 2017

(54) DATA SEEDING OPTIMIZATION FOR DATABASE REPLICATION

(71) Applicant: Microsoft Corporation, Redmond, WA (US)

(72) Inventors: Michael E. Nelson, Redmond, WA (US); Tomas Talius, Sammamish, WA (US); Robin D. Dhamankar, Bellevue, WA (US)

(73) Assignee: MICROSOFT Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/773,587

(22) Filed: Feb. 21, 2013

(65) Prior Publication Data

US 2014/0236887 A1    Aug. 21, 2014

(51) Int. Cl.
G06F 17/30    (2006.01)
(52) U.S. Cl.
CPC ... G06F 17/30289 (2013.01); G06F 17/30575 (2013.01)
(58) Field of Classification Search
None
See application file for complete search history.

(56) References Cited

U.S. PATENT DOCUMENTS

| 7,415,467 | B2 | 8/2008 | Jeevanjee et al. | |
| 8,700,563 | B1* | 4/2014 | Thomson | G06F 17/30171 707/607 |
| 2002/0026502 | A1* | 2/2002 | Phillips | H04L 29/06 709/219 |
| 2011/0173619 | A1* | 7/2011 | Fish | 718/101 |
| 2011/0178984 | A1 | 7/2011 | Talius et al. | |
| 2012/0254114 | A1 | 10/2012 | Gundy et al. | |
| 2012/0259894 | A1 | 10/2012 | Varley et al. | |

OTHER PUBLICATIONS

Bernstein, et al., "Adapting Microsoft SQL Server for Cloud Computing", Retrieved at <<http://ieeexplore.ieee.org/stamp/stamp.jsp?tp=&arnumber=5767935>>, Proceedings: IEEE 27th International Conference on Data Engineering (ICDE), Apr. 11, 2011, pp. 9.

"Implementing Replication and Recovery—Chapter 7. Database Replication", Retrieved at <<http://tinco.pair.com/bhaskar/gtm/doc/books/ao/UNIX_manual/ch07s02.html Retrieved Date: Nov. 26, 2012, pp. 22.

Cecchet, et al., "Middleware-based Database Replication: The Gaps Between Theory and Practice", Retrieved at <<http://arxiv.org/ftp/arxiv/papers/0712/0712.2773.pdf>> Proceedings of the ACM SIGMOD Conference, Vancouver, Canada, Jun. 2008, p. 14.

"Data Replication", Retrieved at <<http://msdn.microsoft.com/en-us/library/ff647672.aspx>> May 23, 2010, pp. 9.

* cited by examiner

*Primary Examiner* — Belix M Ortiz Ditren
(74) *Attorney, Agent, or Firm* — Aneesh Mehta; Kate Drakos; Sandip Minhas

(57) ABSTRACT

Streaming database replication is provided by merging a stream of user transactions with a stream of copy transactions comprising copy data into a combined stream on a source. A target receives a single stream that includes copy transaction and concurrent user transactions in an order that enables conflicts between data being copied and user transactions to be handled correctly. Furthermore, locks applied to data subject to a copy transaction or user transaction can be released once the copy transaction or user transaction is added to the combined stream.

20 Claims, 9 Drawing Sheets

DATA SEEDING OPTIMIZATION FOR DATABASE REPLICATION

BACKGROUND

Business continuity refers to activities performed by organizations to ensure that essential functions will be available to keep an organization running when a disruptive event prevents normal operation. A disruptive event can include hardware failure, data corruption, or loss of a data center facility. One activity that can be performed is to create database replicas, or, in other words, copies of a database. Hardware has reliability limits and failures can occur. Maintaining multiple copies of data in different physical nodes located across independent subsystems, such as server racks, can enhance data durability and fault tolerance. Further, geo-replication of data can provide additional durability in case of a data center loss. Stated differently, one or more database replicas can be maintained in different data centers located hundreds of miles apart within a specific geographic region, for example between North Central and South Central in the United States or between North and West in Europe.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to data seeding optimization for database replication. Creation of a logical replica can involve copying data in batches while propagating changes associated with concurrent user transactions. Consequently, two distinct streams can be involved, namely a copy stream of copy transactions comprising data to be copied to a target and an online stream of user transactions. In accordance with an aspect of this disclosure, the copy stream and online stream can be merged on a source to produce a combined stream. A target receives a single stream comprising copy transactions and concurrent user transactions. Furthermore, the combined stream can be ordered to ensure that any conflicts between data being copied and user transactions are handled correctly. Applying locks on the source while copy transactions and user transactions are added to the combined stream can ensure correct ordering. Locks can be released once corresponding copy transactions and user transactions are added to the combined stream.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Data replication can comprise producing a copy of data of a source database on a target database while still allowing changes to the source database. Stated differently, data seeding can occur with respect to a copy of a database while the database continues to process user transactions. As a batch of data is copied to a target, a lock can be applied to corresponding data on the source. The lock can be released by the source upon receipt of an acknowledgement from the target that the data was successfully saved, or, in other words, committed. Similarly, locks can be acquired on the source for user transactions, which can also wait for acknowledgement that a change has been successfully applied on the target before the lock is released. However, as latency increases between the source and the target, lock duration increases. Consequently, concurrency is reduced with respect to copy transactions and user transactions. In other words, as latency increases the time it takes to copy data and process user transactions also increases. Furthermore, concurrency of a user application that employs the source database will be reduced since the application has to wait for acknowledgement from the target.

Details below are generally directed to data seeding optimization for data replication. A first stream of copy transactions comprising data copied from a database can be merged with a second stream of user transactions on a source database server to produce a single combined stream. A target receives the combined stream comprising data that is being copied and concurrent user transactions. Further, the combined stream is ordered to ensure that any conflicts between copy transactions and user transactions are handled correctly. Locks applied to data on the source while copy transactions and user transactions are added to the combined stream can ensure correct ordering. A lock can be held until a corresponding copy transaction or user transaction has been added locally to the combined stream. By merging streams locally on the source side, rather than on the target side, concurrency increases and is independent of latency between a source and a target.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
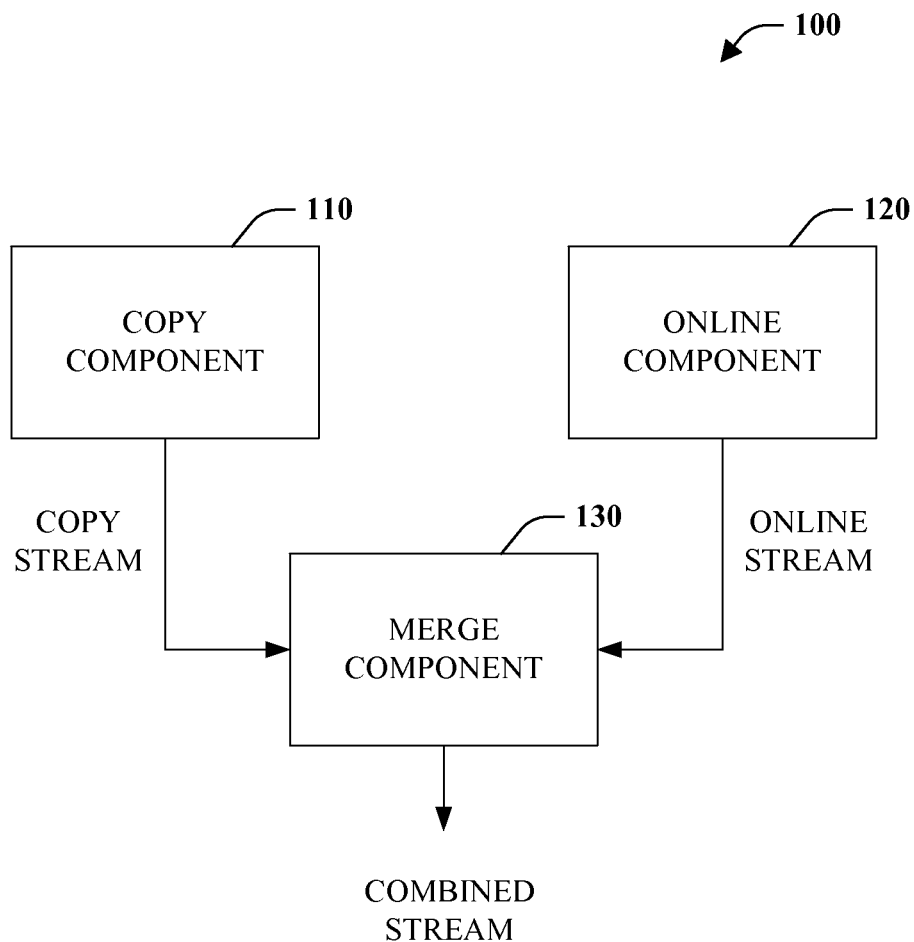
FIG. 1 is a block diagram of a streaming database copy system.

Referring initially to FIG. 1, streaming database copy system 100 is illustrated. The system 100 includes copy component 110 configured to copy data from a source database to enable creation, or, in other words, seeding, of a logically equivalent replica. A logically equivalent replica or copy means a target database includes the same data as the source database but does not necessarily have the same layout bit-by-bit on disk as the source database. A logical copy provides flexibility on how data is encoded on the target. Further, a logical copy allows transformation during a copy operation. Stated differently, a copy can correspond to a transformation of the source. An example of a transformation includes splitting a database where only half the data is copied to the target. More particularly, the copy component 110 is configured to read a batch of data, such as a number of rows of a table in a relational context, and output the data to a copy stream. The copy stream includes a series of copy transactions comprising copy data to be inserted in a target as part of a copy process.

The system 100 also includes online component 120 configured to accept and process user transactions over a source database. For example, a user by way of a user application communicatively coupled with a source database/database server can issue transactions to create, modify, or delete data. In the relational database context, these transactions can correspond to creating a new row, modifying data in an existing row, or deleting a row in a database table. The online component 120 provides functionality to enable user transactions to be executed on the source and output to an online stream comprising a series of user transactions.

Merge component 130 also forms part of system 100. The merge component 130 is configured to output a combined stream that merges the copy stream provided by the copy component 110 and the online stream supplied by the online component 120. The combined stream is ordered by the merge component 130. The order ensures that any conflicts between data being copied and user transactions are processed correctly by a target based on existing logic for handling dependent transactions and applying transactions in commit order. The merge component 130 further at least initiates transmission of the combined stream to a target, which can apply changes associated with either a copy transaction or a user transaction as they are received.

Copying can be performed concurrently with execution of user transactions. To ensure correctness, locks can be employed on data. Among other things, the locks can ensure correct ordering of copy and user transactions in the combined stream. More particularly, the copy component 110 can be configured to apply a lock to copy data, or, in other words, data that is subject to a current copy transaction. In one instance, the copy component 110 can apply a shared lock to copy data. A shared lock allows the data to be read by others but does not allow any changes to the data thereby ensuring the data is stable and not modifiable. For instance, user read/query transactions can be executed when a shared lock is applied. The online component 120 can be configured to apply a lock to data subject to a user transaction. If the data is being read or queried, a shared lock can be applied. Alternatively, if data is being added, altered, or deleted by the transaction an exclusive lock can be applied, which allows only one user/connection to modify a piece of data. In a relational database context, such locks can be row-level locks (as opposed to table-level locks), in one embodiment. The copy component 110 and the online component 120 can release locks on data once corresponding copy or user transactions, respectively, are added to the combined stream, or, in other words, are captured by the combined stream. Accordingly, the copy component 110 and the online component 120 can monitor operation of the merge component 130 or receive notification from the merge component 130 regarding whether a copy or user transaction has been added to the combined stream.

Copying and user transaction application provided by the copy component 110 and the online component 120, respectively, need not be performed concurrently. In one instance, user transactions may be prevented while a copy of a database is generated. It is often undesirable, however, to prevent modification while copying is occurring especially over multiple gigabyte or larger databases. As per user transaction application, copies of a database can exist (e.g., previously created) over which user transactions can be applied to keep the copies up to date.

Figure 2:
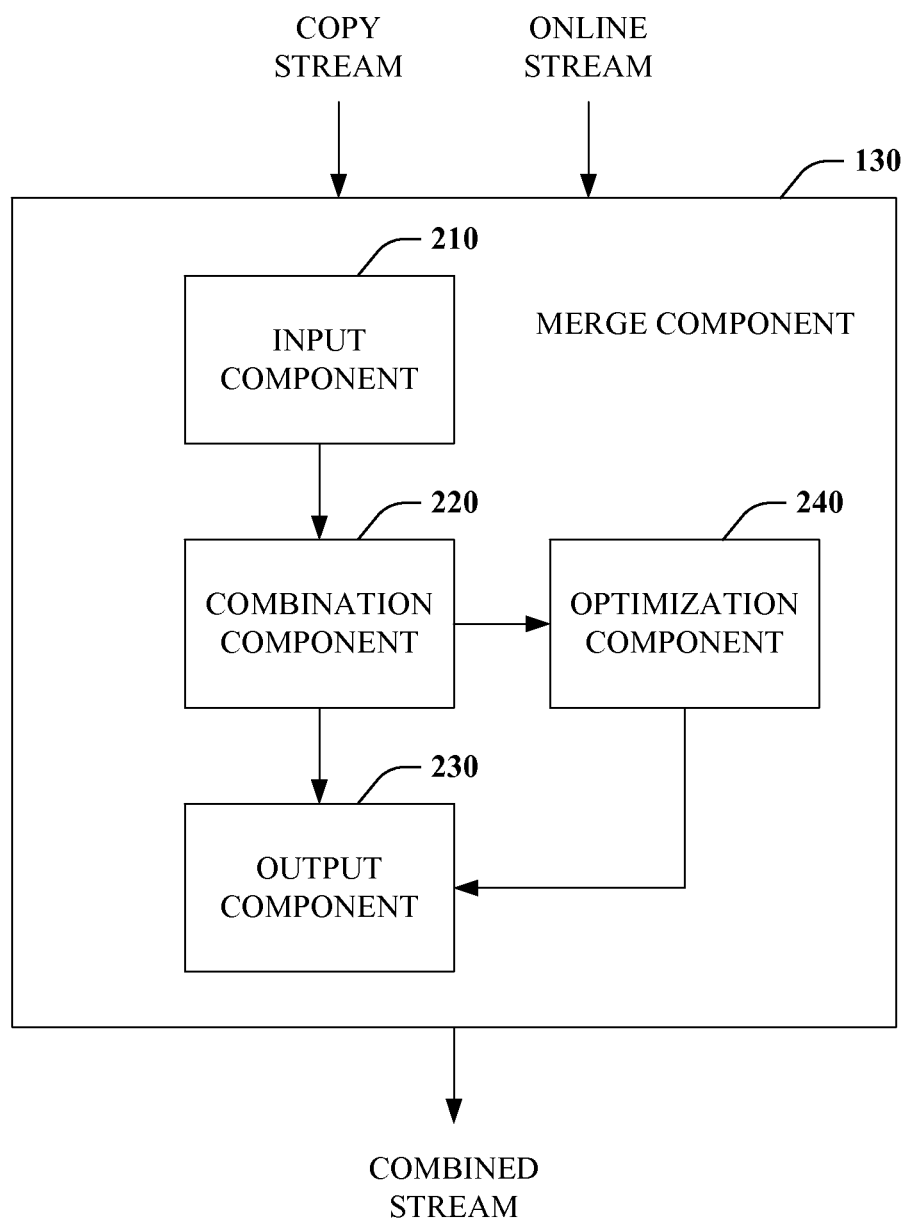
FIG. 2 is a block diagram of a representative merge component.

FIG. 2 depicts a representative merge component 130 in further detail. Input component 210 is configured to receive, retrieve or otherwise obtain or acquire a copy stream and an online stream. The copy stream includes copy transactions that comprise data that is being copied to a target. The online stream comprises one or more user transactions can be happening concurrently with the copy process. Combination component 220 is configured to generate a single stream comprising transactions from the copy stream and the online stream. The single combined stream comprises both data being copied and user transactions linearized in an order that ensures any conflicts that exist between data being copied and user transactions are handled correctly when a target applies changes sequentially. Output component 230 is configured to output or otherwise make the combined stream available. In one instance, the output component 230 can at least initiate transmission of the combined stream to a target of replication. Optimization component 240 is configured to eliminate any redundancies in the combined stream. More particularly, prior to output, the combined stream can be analyzed for redundancies and the stream can be modified to remove any located redundancies. One example of a redundancy can be a first user transaction that adds data and a second transaction that deletes the data. Here, both transactions can be eliminated from the combined stream. As another example, if a row of data is to be copied and a subsequent transaction deletes the row, the combined stream can be modified so that the data is not copied.

Figure 3:
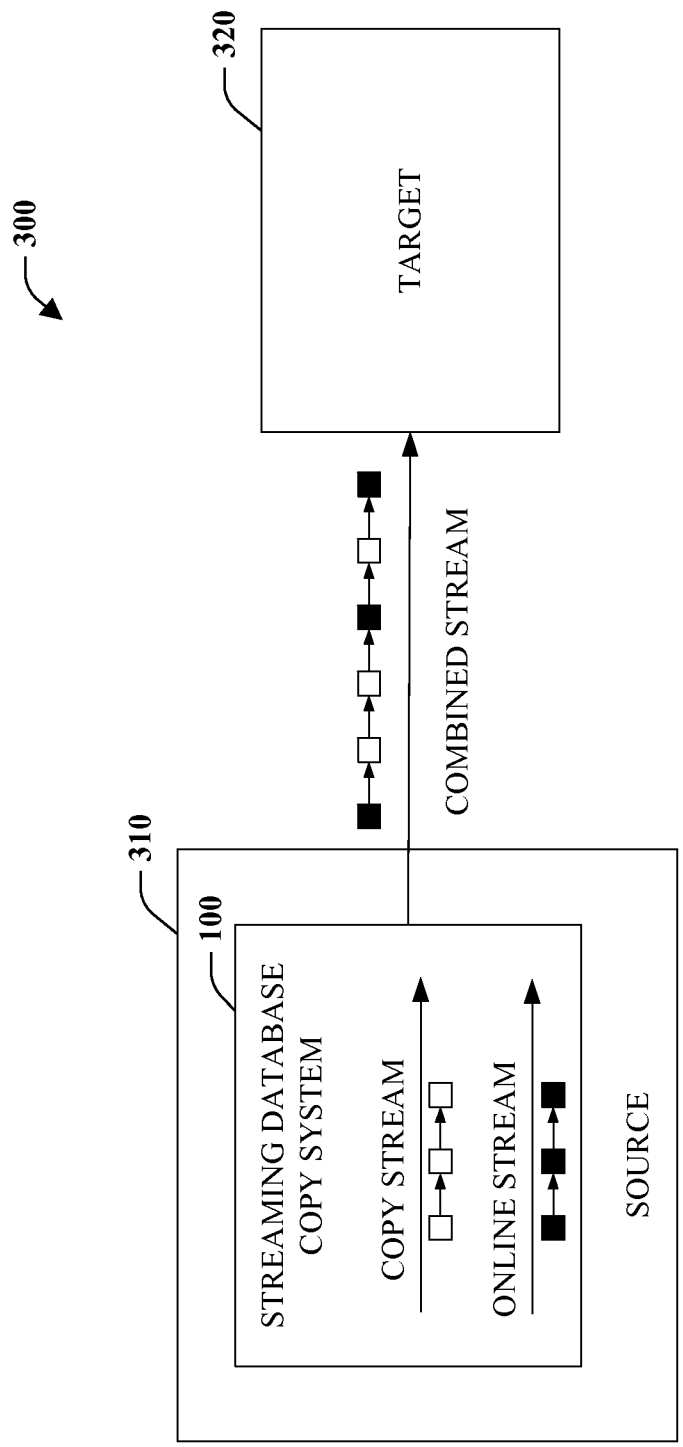
FIG. 3 is a block diagram of a copy system.

FIG. 3 illustrates a block diagram of a copy system 300 that includes source 310 and target 320. The source 310 includes data that is replicated on the target 320. The source 310 can correspond to a first database server and the target 320 can correspond to a second database server. In one embodiment, the first database server and the second database server reside in different geographical regions or data centers to provide additional data durability in case of a data center disaster (e.g., power outage, flood, malicious act . . . ). Replicating in different geographic regions (e.g., West U.S. vs. East U.S. or North Europe vs. West Europe) is also referred to as geo-replication. In another embodiment, the first database server and the second database server can reside in the same region or data center. In other words, geo-replication pertains to situations where the source 310 and the target 320 are remote. Otherwise, the source 310 and target 320 can be considered local as part of the same data center, for example.

As shown, the streaming database copy system 100 can coalesce the copy stream and online stream on the source 310 (or source side). The target 320 receives a single combined stream comprising both data that is being copied, as part of a copy transaction, and user transactions in a particular order. The target applies changes, specified by the copy and user transactions, sequentially respecting the transactional ordering of the combined stream.

There are advantages to generating a combined stream on the source 310 as opposed to sending the copy stream and online stream to the target 320 and combining the streams on the target 320. Each batch of data that is copied need not wait for acknowledgement that data was successfully committed on the target 320 prior to releasing a lock. Rather, the lock can be released when the data is added to the combined stream, as previously described. Accordingly, lock duration and concurrency are not affected by latency between the source 310 and target 320, for example associated with communication between remote database servers. Similarly, user transactions need not wait for acknowledgement from the target 320 prior to releasing locks. Instead, the data locks can be released when corresponding transactions are added to the combined stream. As a result, concurrency of a user application that employs the source database will be unaffected by latency between the source 310 and target 320. More generally, lock duration is governed by the time it takes to add changes (copy or user transaction) to the combined stream as opposed to how long it takes a target to apply the changes and return an acknowledgement thereof.

Figure 4:
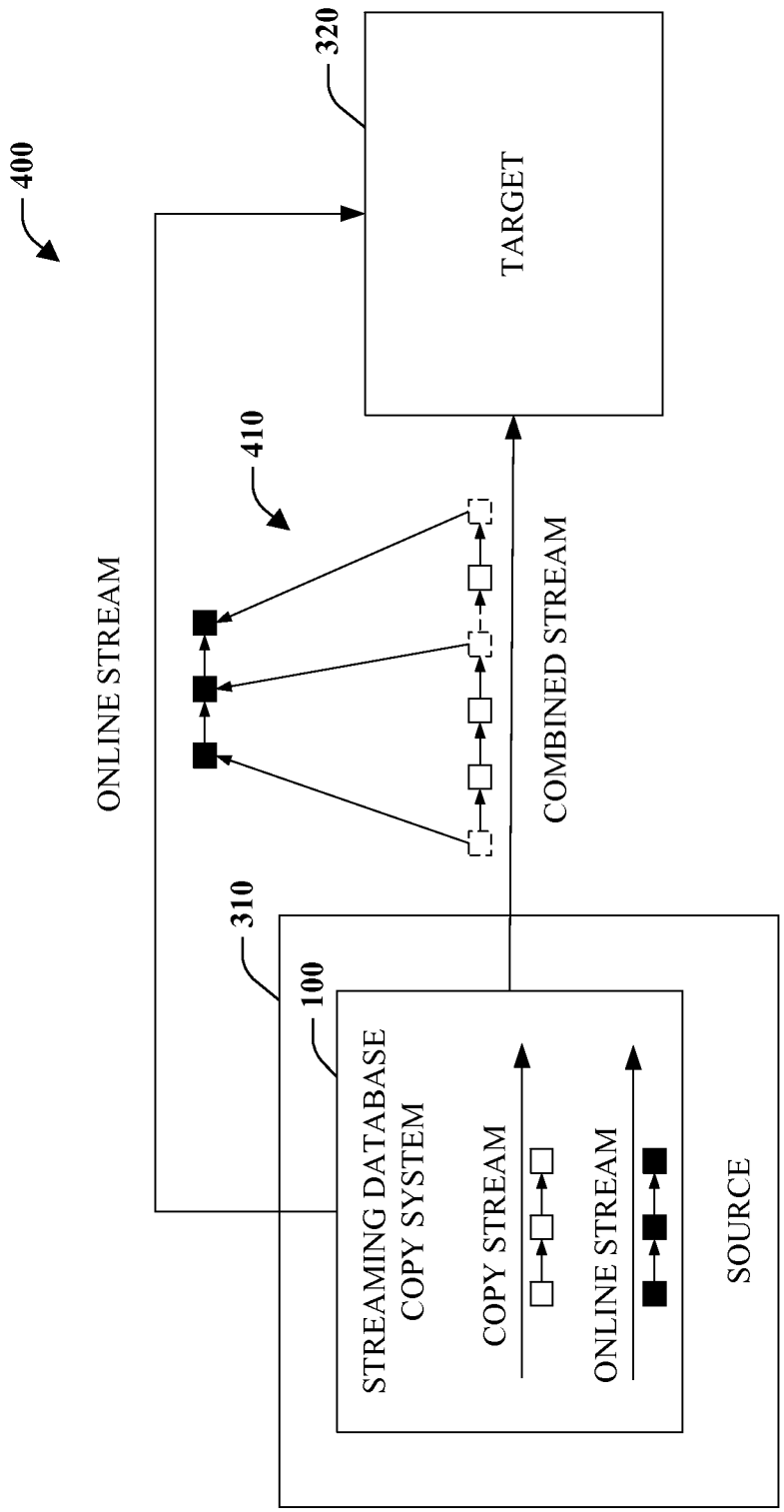
FIG. 4 is a block diagram of a copy system.

FIG. 4 is a block diagram of a copy system 400. Similar to copy system 300 of FIG. 3, copy system 400 includes the source 310 and the target 320 as well as the streaming database copy system 100 executed on the source 310. Here, however, the online stream of user transactions can be shared with other copies of a database including a target in which solely user transactions are being applied and/or a target that is being seeded while applying user transactions. Further, separate copy streams are generated for each of one or more targets being seeded. For example, the online stream can be shared by local replicas of the source in the same data center or on the same server. In this case, the combined stream can include actual copy data, or copy transactions comprising copy data, with virtual transactions including pointers 410 to corresponding user transactions in the online stream. In other words, rather than making an additional copy of the online stream payload, the payload is referenced from the combined stream. Stated yet another way, logical multiplexing of streams is provided.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the optimization component 240 can employ such mechanisms in conjunction with identification and/or elimination of redundancies in a combined stream.

In view of the exemplary systems described above, methodologies that may be implemented in accordance with the disclosed subject matter will be better appreciated with reference to the flow charts of FIGS. 5-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 5:
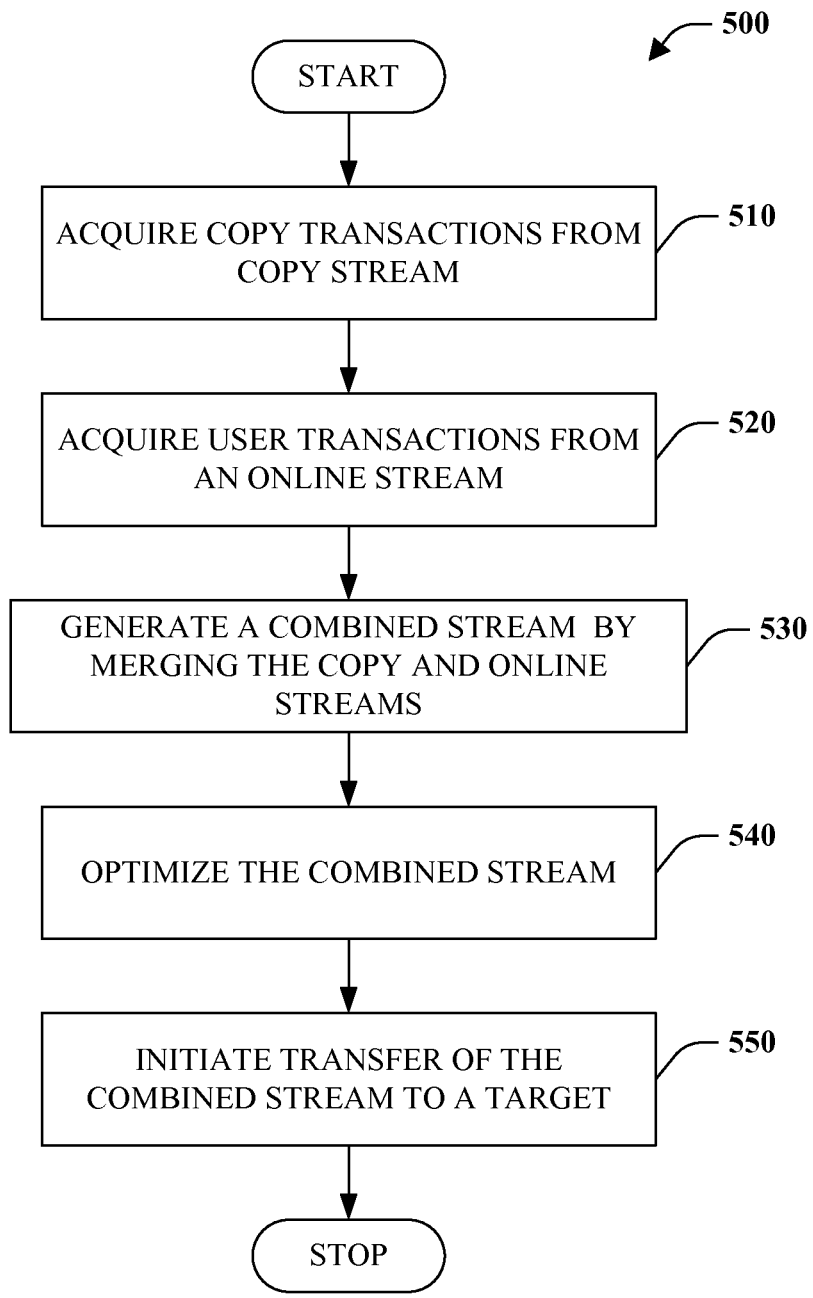
FIG. 5 is a flow chart diagram of a database copy method.

Referring to FIG. 5, a streaming database copy method 500 is illustrated. At reference numeral 510, copy transactions are received, retrieved, or otherwise obtained or acquired from a copy stream. In other words, a series of transactions including rows of data, for example, on the copy stream can be acquired. At numeral 520, one or more user transactions are received, retrieved, or otherwise obtained or acquired from an online stream. Here, the payload of the online stream is a series of transactions (e.g., create, read, update, delete) over a data source being copied. At reference 530, a combined stream is generated by merging the copy stream and the online stream. More specifically, the combined stream can include both data being copied and concurrent user transactions. Further, the copy transactions and user transactions are ordered such that application of changes in the order specified ensures any conflicts between the data being copied and the user transactions are handled correctly. Such ordering can be accomplished by holding locks on the source while copy and transaction transactions are inserted onto the combined stream. At numeral 540, the combined stream can be optimized by identifying and removing redundant operations. For instance, where a transaction adds a row of data and subsequently deletes the row, both the transactions adding the row and deleting the row can be eliminated. At numeral 550, transmission of the combined, and potentially optimized, stream to a target can at least be initiated. For instance, transmission of the combined stream can be initiated over a transmission control protocol (TCP) or other connection between a source and target.

Figure 6:
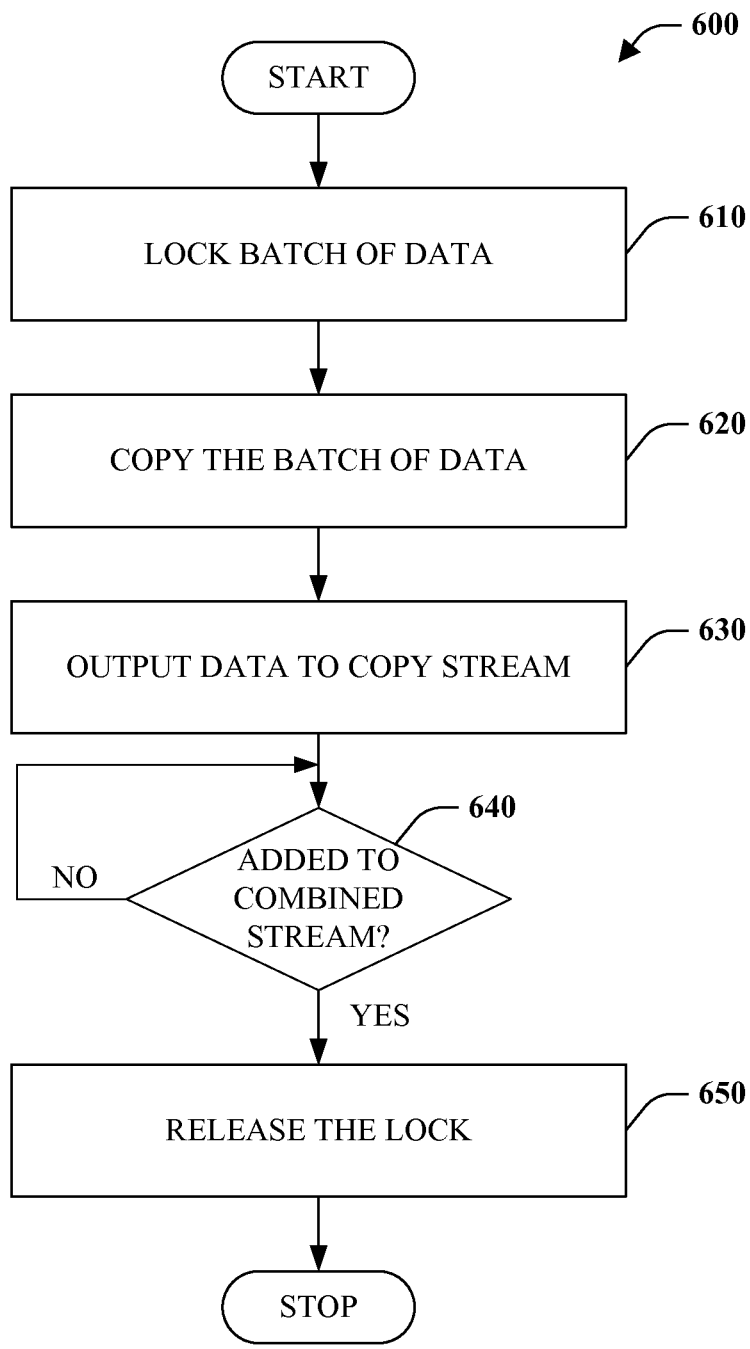
FIG. 6 is a flow chart diagram of a method of copying data.

FIG. 6 depicts a method of copying data 600. At numeral 610, a batch of data is locked. A batch of data can correspond to a plurality of rows of a table in the relational database context. Further, the lock can be a shared lock that allows the data to be read by others but does not allow any changes to the data. At numeral 620, the batch of data is copied. At reference numeral 630, the copied batch of data is output to a copy stream comprising data to be copied to a target, as part of a copy transaction. A check is made at reference 640 as to whether the copy transaction has been added to a combined stream comprising data that is to be copied as well as concurrent user transactions. If the copy transaction has not been added to the combined stream ("NO"), the method loops back to 640. If the copy transaction has been added to the combined stream ("YES"), the method proceeds to 650. At numeral 650, the lock applied to the batch of data is released.

Figure 7:
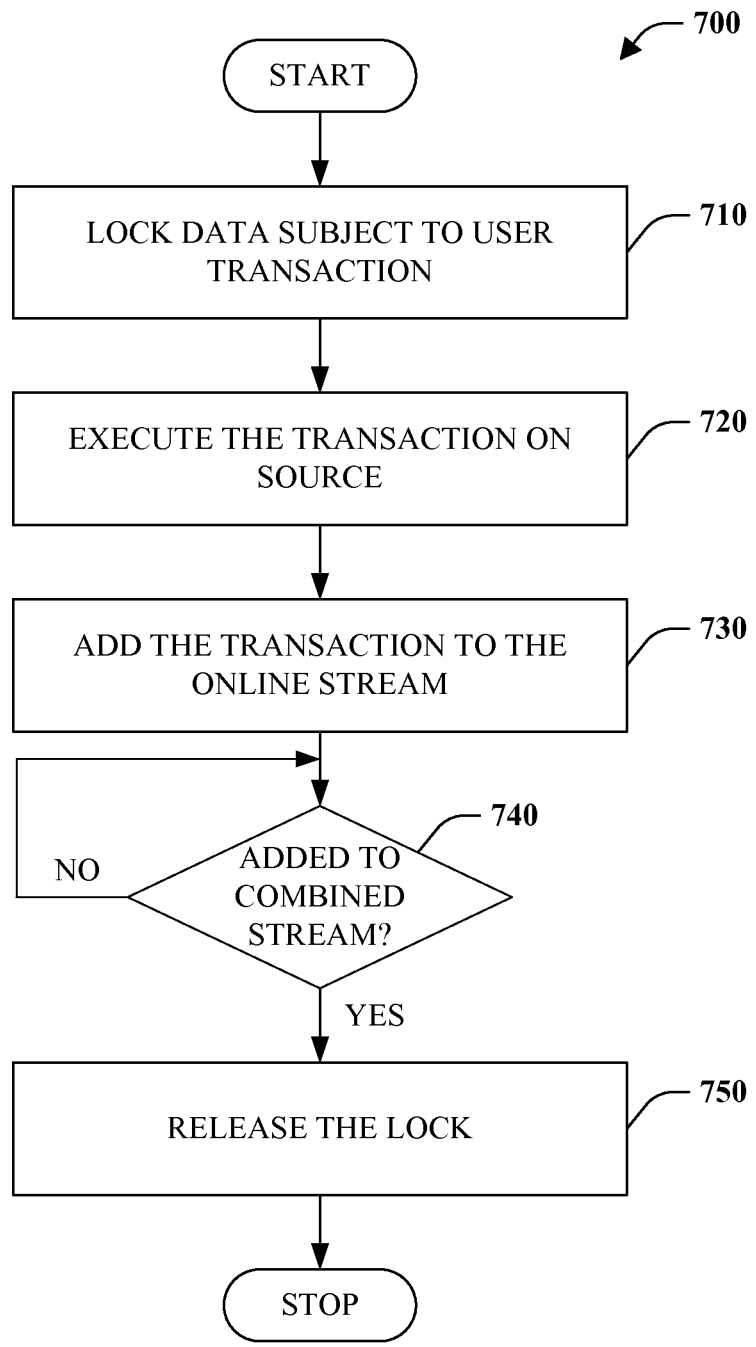
FIG. 7 is a flow chart diagram of a method of user transaction processing.

FIG. 7 illustrates a method of user transaction processing 700. At reference numeral 710, data subject to a user transaction is locked. In other words, data over which transaction is to be applied is locked. At numeral 720, the transaction is executed on a source database. For example, a transaction can add, modify, or delete data on the source. At reference 730, the transaction is added to an online stream comprising user transactions over a source database. At reference 740, a determination is made as to whether the transaction has been added to a combined stream comprising data to be copied as well as user transactions. If the user transaction has not been added to the combined stream ("NO"), the method loops back to numeral 740. If the user transaction has been added to the combined stream ("YES"), the method continues at 750. At reference numeral 750, the lock applied to data subject to the user transaction is released.

Figure 8:
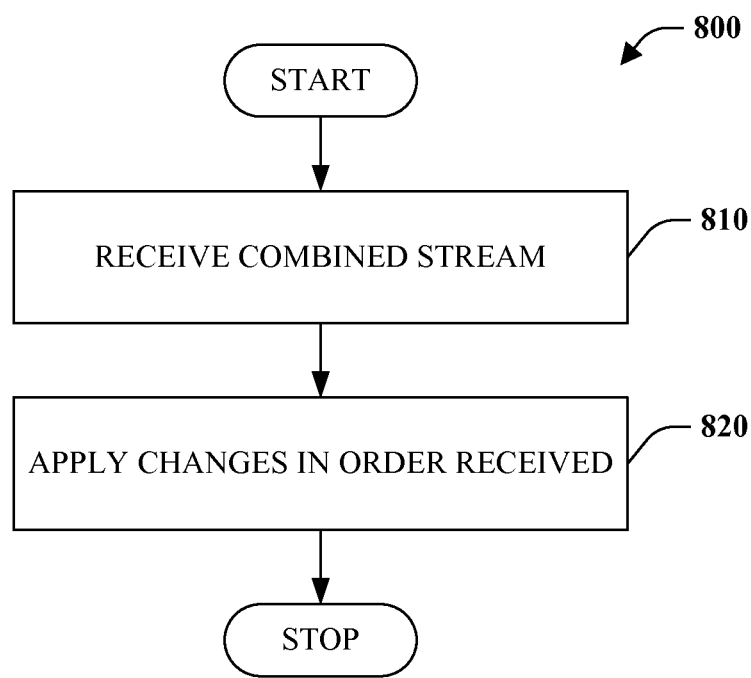
FIG. 8 is a flow chart diagram of a method of processing a combined stream.

FIG. 8 is a flow chart diagram of a method of processing a combined stream. At reference numeral 810, a target, such as a target database server, receives, or otherwise acquires, a continuous flow of changes from a combined stream provided by a source. The combined stream can include change transactions associated with data copy, or replication, as well as user transactions. At numeral 820, changes specified in the combined stream are applied to a target database in the order in which the change transactions are received to respect transactional ordering.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

In order to provide a context for the claimed subject matter, FIG. 8 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

Figure 9:
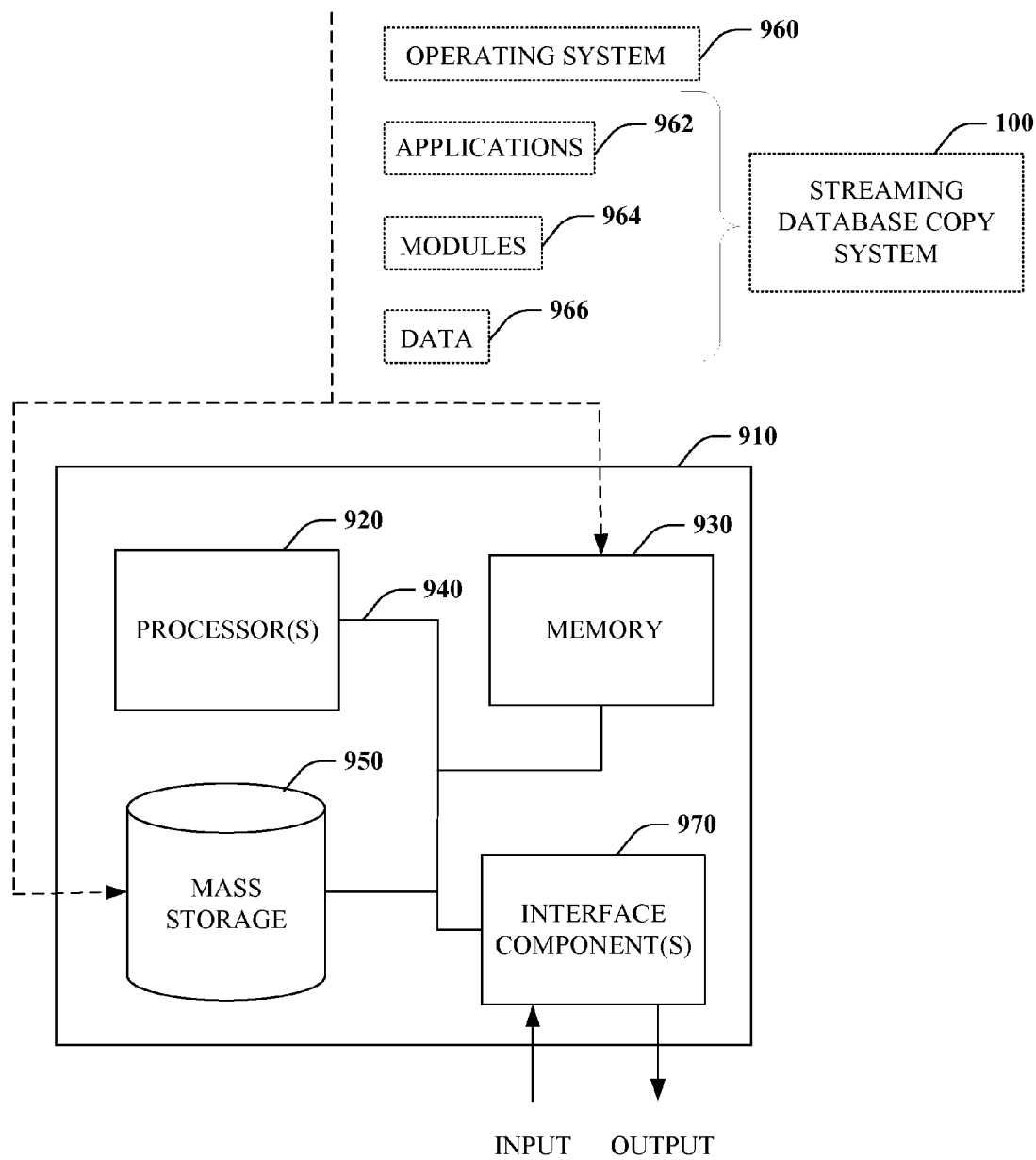
FIG. 9 is a schematic block diagram illustrating a suitable operating environment for aspects of the subject disclosure.

With reference to FIG. 9, illustrated is an example general-purpose computer 910 or computing device (e.g., desktop, laptop, tablet, server, hand-held, programmable consumer or industrial electronics, set-top box, game system, compute node . . . ). The computer 910 includes one or more processor(s) 920, memory 930, system bus 940, mass storage 950, and one or more interface components 970. The system bus 940 communicatively couples at least the above system components. However, it is to be appreciated that in its simplest form the computer 910 can include one or more processors 920 coupled to memory 930 that execute various computer executable actions, instructions, and or components stored in memory 930.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration.

The computer 910 can include or otherwise interact with a variety of computer-readable media to facilitate control of the computer 910 to implement one or more aspects of the claimed subject matter. The computer-readable media can be any available media that can be accessed by the computer 910 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that can be used to store the desired information and accessed by the computer 910. Furthermore, computer storage media excludes modulated data signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 930 and mass storage 950 are examples of computer-readable storage media. Depending on the exact configuration and type of computing device, memory 930 may be volatile (e.g., RAM), non-volatile (e.g., ROM, flash memory . . . ) or some combination of the two. By way of example, the basic input/output system (BIOS), including basic routines to transfer information between elements within the computer 910, such as during start-up, can be stored in nonvolatile memory, while volatile memory can act as external cache memory to facilitate processing by the processor(s) 920, among other things.

Mass storage 950 includes removable/non-removable, volatile/non-volatile computer storage media for storage of large amounts of data relative to the memory 930. For example, mass storage 950 includes, but is not limited to, one or more devices such as a magnetic or optical disk drive, floppy disk drive, flash memory, solid-state drive, or memory stick.

Memory 930 and mass storage 950 can include, or have stored therein, operating system 960, one or more applications 962, one or more program modules 964, and data 966. The operating system 960 acts to control and allocate resources of the computer 910. Applications 962 include one or both of system and application software and can exploit management of resources by the operating system 960 through program modules 964 and data 966 stored in memory 930 and/or mass storage 950 to perform one or more actions. Accordingly, applications 962 can turn a general-purpose computer 910 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the streaming database copy system 100, or portions thereof, can be, or form part, of an application 962, and include one or more modules 964 and data 966 stored in memory and/or mass storage 950 whose functionality can be realized when executed by one or more processor(s) 920.

In accordance with one particular embodiment, the processor(s) 920 can correspond to a system on a chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the streaming database copy system 100 and/or associated functionality can be embedded within hardware in a SOC architecture.

The computer 910 also includes one or more interface components 970 that are communicatively coupled to the system bus 940 and facilitate interaction with the computer 910. By way of example, the interface component 970 can be a port (e.g., serial, parallel, PCMCIA, USB, FireWire . . . ) or an interface card (e.g., sound, video . . . ) or the like. In one example implementation, the interface component 970 can be embodied as a user input/output interface to enable a user to enter commands and information into the computer 910, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 970 can be embodied as an output peripheral interface to supply output to displays (e.g., CRT, LCD, LED, plasma . . . ), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of configuring a primary server, storing a primary replica of a database, to seed a target server storing a target replica of the database, comprising:
   transmitting, to the target server, a sequential stream of data commits for the target replica;
   selecting respective batches of records of the primary replica;
   for respective batches of records of the primary replica:
      acquiring a batch lock over a portion of the primary replica that comprises the batch;
      inserting the batch into the sequential stream for committing to the target replica; and
      on condition of completing the inserting, releasing the batch lock; and
   responsive to receiving a transaction that modifies the database:
      acquiring a transaction lock over a portion of the primary replica that is modified by the transaction;

determining a sequential position of the transaction in the sequential stream, relative to a batch inserted into the sequential stream that is modified by the transaction, such that applying the data commits of the sequential stream in sequential order makes the target replica consistent with the primary replica;
inserting the transaction into the sequential stream at the sequential position; and
on condition of completing the inserting, releasing the transaction lock.

2. The method of claim 1, further comprising: responsive to receiving a second transaction that reads a portion of the database:
locking the portion of the primary replica with a shared lock that allows data to be read but not modified;
permitting the second transaction to read the portion of the primary replica; and
responsive to completion of the second transaction, releasing the shared lock.

3. A system that enables a primary server storing a primary replica of a database to seed a target server storing a target replica of the database, the system comprising:
a processor coupled to a memory storing instructions that, responsive to execution by the processor, provide:
a stream transmitter that transmits, to the target server, a sequential stream of data commits for the target replica;
a batch transmitter that:
selects respective batches of records of the primary replica;
acquires a batch lock over a portion of the primary replica that comprises the batch;
inserts the batch into the sequential stream for committing to the target replica; and
on condition of completing the inserting, releases the batch lock; and
a transaction transmitter that, responsive to receiving a transaction that modifies the database:
acquires a transaction lock over a portion of the primary replica that is modified by the transaction;
determines a sequential position of the transaction in the sequential stream, relative to a batch inserted into the sequential stream that is modified by the transaction, such that applying the data commits of the sequential stream in sequential order makes the target replica consistent with the primary replica;
inserts the transaction into the sequential stream at the sequential position; and
on condition of completing the inserting, releases the transaction lock.

4. A computer-readable storage medium having instructions stored thereon that enable at least one processor to perform a method of enabling a primary server storing a primary replica of a database to seed a target server storing a target replica of the database, the method comprising:
transmitting, to the target server, a sequential stream of data commits for the target replica;
selecting respective batches of records of the primary replica;
for respective batches of records of the primary replica:
acquiring a batch lock over a portion of the primary replica that comprises the batch;
inserting the batch into the sequential stream for committing to the target replica; and
on condition of completing the inserting, releasing the batch lock; and responsive to receiving a transaction that modifies the database:
acquiring a transaction lock over a portion of the primary replica that is modified by the transaction;
determining a sequential position of the transaction in the sequential stream, relative to a batch inserted into the sequential stream that is modified by the transaction, such that applying the data commits of the sequential stream in sequential order makes the target replica consistent with the primary replica;
inserting the transaction into the sequential stream at the sequential position; and
on condition of completing the inserting, releasing the transaction lock.

5. The method of claim 1, wherein inserting the batch into the sequential stream further comprises:
determining a sequential position of the batch in the sequential stream, relative to a transaction inserted into the sequential stream that modifies the batch, wherein applying the data commits of the sequential stream in sequential order makes the target replica consistent with the primary replica; and
inserting the batch into the sequential stream at the sequential position.

6. The method of claim 1, wherein receiving the transaction further comprises: receiving the transaction while selecting the respective batches of the primary replica for transmission to the target server during seeding of the target replica of the database.

7. The method of claim 1, wherein selecting respective batches of the primary replica further comprises: for respective tables of the primary replica, partitioning the records of the table into batches.

8. The method of claim 1, wherein executing the instructions by the processor further causes the device to:
among respective data commits inserted into the sequential stream, identify a dependency relationship among a first data commit and a second data commit; and
verify that the positions of the first data commit and the second data commit are consistent with the dependency relationship.

9. The method of claim 1, wherein executing the instructions further causes the primary server to:
examine the sequential stream of data commits to identify a first data commit that is superseded by a second data commit of the sequential stream; and
remove the first data commit from the sequential stream and refraining from transmitting the first data commit to the target server.

10. The method of claim 9, wherein:
the first data commit further comprises a creation of a record of the database;
the second data commit follows the first data commit in the sequential stream, and further comprises a deletion of the record of the database; and
removing the first data commit from the sequential stream further comprises:
removing, from the sequential stream, both the first data commit and the second data commit.

11. The method of claim 9, wherein:
the first data commit further comprises an update of a record of the database;
the second data commit follows the first data commit in the sequential stream, and further comprises a deletion of the record of the database; and
removing the first data commit from the sequential stream further comprises:

removing, from the sequential stream, the first data commit comprising the update of the record.

12. The method of claim 1, wherein inserting a transaction into the sequential stream further comprises:
  determining whether the transaction references a data unit that is included in a second data commit of the sequential stream; and
  responsive to determining that the transaction references a data unit that is included in a second data commit, inserting the transaction into the sequential stream with a reference to the data unit included in the second data commit.

13. The method of claim 1, wherein:
  inserting the batch into the sequential stream further comprises: checking a status of inserting the batch into the sequential stream to detect a completion of the inserting; and
  releasing the batch lock further comprises: on condition of the checking detecting the completion of inserting the batch into the sequential stream, release the batch lock.

14. The method of claim 1, wherein:
  inserting the transaction into the sequential stream further comprises: checking a status of inserting the transaction into the sequential stream to detect a completion of the inserting; and
  releasing the transaction lock further comprises: on condition of the checking detecting the completion of inserting the transaction into the sequential stream, release the transaction lock.

15. The method of claim 1, wherein inserting a data commit into the sequential stream further comprises:
  initiating insertion of the data commit into the sequential stream; and
  receiving, from the sequential stream, notification of completion of the insertion of the data commit.

16. The method of claim 1, wherein acquiring a lock over a portion of the primary replica further comprises: acquiring, over a portion of the primary replica of the database, a lock of a lock type selected from a lock type set comprising:
  a table-level lock that applies to all records in a table of the primary replica; and
  a row-level lock that applies to a subset of records of a table of the primary replica.

17. The method of claim 1, wherein acquiring the batch lock further comprises: acquiring, over a portion of the primary replica that comprises the batch, a shared batch lock that permits other transactions to access the portion, and restricts other transactions from modifying the portion.

18. The method of claim 1, wherein:
  the primary server concurrently seeds at least two target servers that respectively store a target replica of the database; and
  transmitting the sequential stream of data commits to the target server further comprises: for the respective target servers, transmitting a target-specific sequential stream of data commits only to the target server.

19. The method of claim 1, wherein releasing the batch lock further comprises: releasing the batch lock on the portion of the database that comprises the batch before transmitting the batch to the target server via the sequential stream.

20. The method of claim 1, wherein releasing the transaction lock further comprises: releasing the transaction lock on the portion of the database modified by the transaction before transmitting the transaction to the target server via the sequential stream.

* * * * *